United States Patent
Westendorf et al.

(10) Patent No.: US 11,359,922 B2
(45) Date of Patent: Jun. 14, 2022

(54) METHOD AND DEVICE FOR SCANNING A LOCATION

(71) Applicant: Robert Bosch GmbH, Stuttgart (DE)

(72) Inventors: Andreas Westendorf, Hildesheim (DE); Sanghmitra Gupta, Stuttgart (DE); Dominik Brunner, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 638 days.

(21) Appl. No.: 16/341,985

(22) PCT Filed: Sep. 19, 2017

(86) PCT No.: PCT/EP2017/073570
§ 371 (c)(1),
(2) Date: Apr. 15, 2019

(87) PCT Pub. No.: WO2018/072948
PCT Pub. Date: Apr. 26, 2018

(65) Prior Publication Data
US 2019/0249996 A1    Aug. 15, 2019

(30) Foreign Application Priority Data

Oct. 17, 2016 (DE) .......................... 102016220216.2

(51) Int. Cl.
*G01C 21/28* (2006.01)
*G01C 21/16* (2006.01)
*G01S 19/42* (2010.01)
*G01S 19/49* (2010.01)
*G01S 19/34* (2010.01)

(52) U.S. Cl.
CPC ........... *G01C 21/28* (2013.01); *G01C 21/165* (2013.01); *G01S 19/34* (2013.01); *G01S 19/42* (2013.01); *G01S 19/49* (2013.01)

(58) Field of Classification Search
CPC .......... G01S 19/49; G01S 19/42; G01S 19/34; G01C 21/165; G01C 21/28
USPC ........................................................ 702/150
See application file for complete search history.

(56) References Cited

U.S. PATENT DOCUMENTS

| 6,559,794 B1 | 5/2003 | Nakajima et al. | |
|---|---|---|---|
| 2010/0030428 A1* | 2/2010 | Gartner | B62D 15/0245 701/42 |
| 2016/0063330 A1* | 3/2016 | Xu | B60R 1/00 382/103 |
| 2019/0235083 A1* | 8/2019 | Zhang | G01S 7/4808 |
| 2019/0272746 A1* | 9/2019 | Aguiar | G08G 1/065 |
| 2021/0156982 A1* | 5/2021 | Stettiner | G01S 7/0232 |

FOREIGN PATENT DOCUMENTS

EP    2280240 A2    2/2011

OTHER PUBLICATIONS

International Search Report for PCT/EP2017/073570, dated Jan. 5, 2018.

* cited by examiner

*Primary Examiner* — Aditya S Bhat
(74) *Attorney, Agent, or Firm* — Norton Rose Fulbright US LLP; Gerard Messina

(57) ABSTRACT

A method for scanning a location, including the following features: an ego velocity is measured at predefined points in time, and a counter is incremented as a function of the ego velocity, and as soon as the counter reaches a predefined threshold value, the location is determined.

7 Claims, 2 Drawing Sheets

METHOD AND DEVICE FOR SCANNING A LOCATION

CROSS-REFERENCE TO RELATED APPLICATIONS

The present application is a national phase to International Application No. PCT/EP2017/073570, filed Sep. 19, 2017, and claims priority to German Patent Application No. 10 2016 220 216.2, filed Oct. 17, 2016, all of which are hereby incorporated by reference in their entireties.

FIELD

The present invention relates to a method for scanning a location. In addition, the present invention relates to a corresponding device, a corresponding computer program as well as a corresponding memory medium.

BACKGROUND INFORMATION

In the geosciences and in cartography, in particular, the ego position of an observer or a measuring instrument on the earth's surface or in a suitable geometrical reference system is referred to as the location, position or topocenter. The determination of the location is conventionally known as position finding and usually relates to a global coordinate system.

The term 'track' is used in geoinformatics for an ordered list of coordinates of this type that describe a covered distance. This requires sampling of the time-continuous position signal. To the extent that such sampling is carried out at equidistant points in time, i.e., periodically, its frequency is referred to as the scanning rate, sampling rate or sample rate, as is common in signal processing. To compress the resulting track without the need to include additional geodata, the Douglas Peucker algorithm is typically employed in the related art in order to remove individual random samples from the time series (so-called weeding).

In addition, determination and recording of the location is conventionally distributed to different devices, which are connected in a wireless manner in most cases. The NMEA 0183 standard, which is based on CAN, is typically used for this transmission.

The European patent 2280240 A2 describes a method and a system for generating dynamic positional information. The method and the system are characterized in that a first and a second consecutive point in time from among at least two points in time for which geographical positions are generated are separated by a time interval, the time interval having a length that is determined in a dynamic manner on the basis of a velocity of the vehicle. This allows for different time intervals between consecutive points in time at which positional information is determined, this being the case because the length of each time interval is a function of a velocity of the vehicle or a driving direction of the vehicle. This optimizes the generation of positional information and the quantity of the generated data.

SUMMARY

The present invention provides a method for scanning a location, a corresponding device, such as in the form of a telematics control unit for a motor vehicle, a corresponding computer program as well as a corresponding memory medium.

One advantage of this approach is the data compression, which is achieved by a reduction of the scanned data and nonessential points. The approach according to the present invention is based on transmitting data more frequently at lower velocities (e.g., within city limits) than at higher velocities (such as on interstates). This is, in turn, based on the understanding that it is difficult, for example, to detect the distance covered by an automobile driving within city limits when its GPS position is polled only at an interval of 5 minutes, whereas a data transmission once a minute during travel on an interstate leads to redundant data. Using dynamic scanning, more information is able to be obtained from a lower number of random samples, which leads to a data compression.

Exploiting this, the demands on the integrated electronics in terms of its processing power and storage capacity required for scanning a location are reduced and dependencies on potentially unreliable digital map data are eliminated. In addition, the transmission costs are reduced because fewer data are transmitted.

Due to the measures described herein, advantageous further developments and improvements of the described embodiments of the present invention are possible.

BRIEF DESCRIPTION OF THE DRAWINGS

Exemplary embodiments of the present invention are shown in the figures and are described in greater detail below.

DETAILED DESCRIPTION OF EXAMPLE EMBODIMENTS

Figure 1:
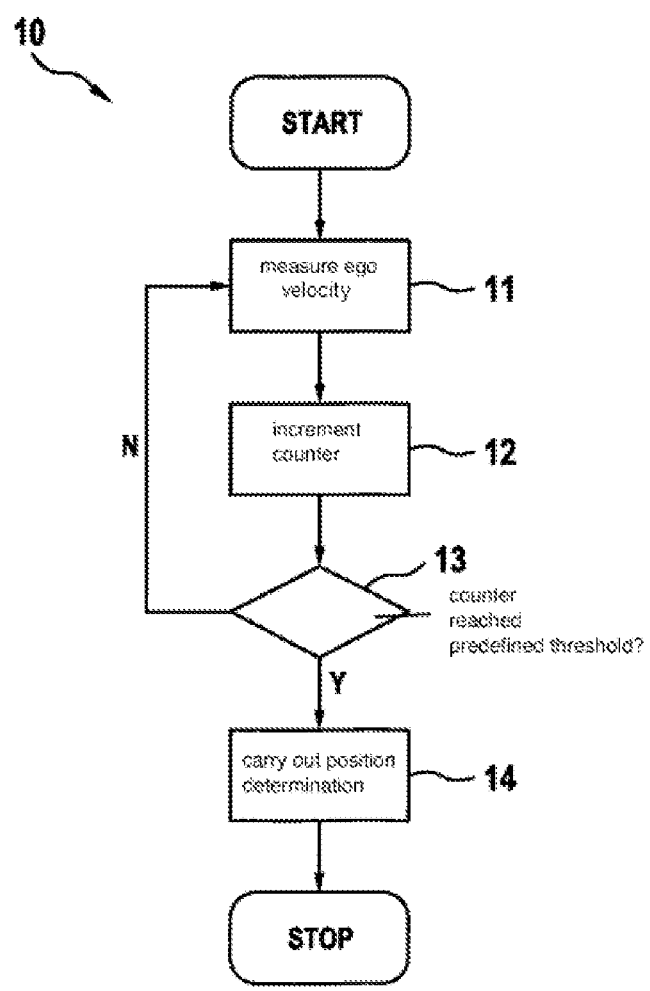
FIG. 1 shows a flow diagram of a method according to a first specific embodiment.

FIG. 1 illustrates the basic sequence of a method according to the present invention (10) across a single scanning cycle; the method steps will be described using the example of a position determination inside a vehicle. To begin with, the vehicle in this scenario measures its ego velocity (process 11) and increments a counter (process 12) as a function of the ego velocity. It then checks whether the counter has reached a predefined threshold value (decision 13). If this condition has been satisfied (branch Y), the vehicle carries out a position determination (process 14) and further processes it. The further processing may be carried out either in the memory medium or externally, by transmitting the data by way of a wire-conducted or wireless communications path (such as via an air interface). However, if the counter does not reach the mentioned threshold value, the vehicle will repeat the executed steps in due course, starting with another measurement (11).

In order to achieve an acceptable compression, certain weight factors which are used as the basis for the desired scanning resolution are defined in a corresponding software. These weight factors are flexible and are able to be modified and configured at any time, also via the air interface.

By way of example, the desired data resolution may be defined in the following manner:

| Velocity Range (km/h) | Typical Use Application | Desired Resolution (km) |
|---|---|---|
| 0-50 | Within city limits | 0.2-1 |
| 50-100 | Federal highway | 1-6 |
| 100-250 | Interstate | 6-10 |

Figure 2:
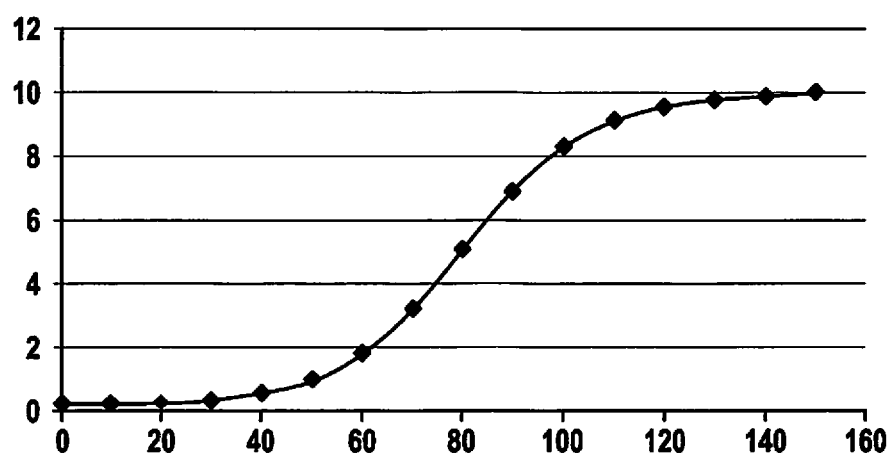
FIG. 2 shows the dependency of the temporal resolution of a location determination on the velocity of an exemplary vehicle.

In an effort to generalize the relation between the velocity and the desired resolution defined in this way, the resolution in km is plotted against the velocity in km/h, a curve is adapted on the basis of the *tangens hyperbolicus*, and the function graph according to FIG. 2 is obtained as a result.

If the desired minimum resolution is denoted as a, the maximum resolution as b, and the driving velocity as v, then the following generalized relation may be derived for resolution $R_n$ given the selection of a suitable constant variable c:

$$R_n = \frac{1}{10}\left((a+b) + (b-a)\tanh\frac{v-v_0}{c}\right)$$

Weight factor $G_n$ thus satisfies the following equation:

$$G_n = \frac{T v_n}{R_n}$$

In order to determine a velocity-dependent scanning rate, a certain weight factor is allocated to each value of the velocity. For each velocity $v_1$ to $v_n$ that is polled per second, the corresponding weight factor $G_1$ to $G_n$ is selected and used in order to increment a counter by the selected weight factor. As soon as the counter reaches a predefined threshold value T, the data are transmitted and the counter is reset to zero. In this case, the location is ascertained using GPS or some other global navigation-satellite system (GNSS) and transmitted.

In such a case, threshold value T is selected so that the counter reaches it according to the described method (10) when—at the given velocity—a distance that corresponds to the desired spatial resolution has been covered, that is to say, after the following driving time:

$$t_n = \frac{R_n}{v_n}$$

The threshold value may thus be determined as the smallest common multiple of the values $t_1$ to $t_{25}$ according to the following lookup table (LUT):

| n | $v_n$ | $R_n$ | $t_n$ | $G_n$ |
|---|---|---|---|---|
| 1 | 0-10 km/h | 0.1000 km | 72.00 s | 1.00 |
| 2 | 10-20 km/h | 0.3000 km | 72.00 s | 1.00 |
| 3 | 20-30 km/h | 0.5000 km | 72.00 s | 1.00 |
| 4 | 30-40 km/h | 0.7000 km | 72.00 s | 1.00 |
| 5 | 40-50 km/h | 0.9000 km | 72.00 s | 1.00 |
| 6 | 50-60 km/h | 1.3167 km | 86.18 s | 0.84 |
| 7 | 60-70 km/h | 2.1167 km | 117.23 s | 0.61 |
| 8 | 70-80 km/h | 2.9167 km | 140.00 s | 0.51 |
| 9 | 80-90 km/h | 3.7167 km | 157.41 s | 0.46 |
| 10 | 90-100 km/h | 4.5167 km | 171.16 s | 0.42 |
| 11 | 100-110 km/h | 5.625 km | 192.86 s | 0.37 |
| 12 | 110-120 km/h | 6.875 km | 215.22 s | 0.33 |
| 13 | 120-130 km/h | 8.125 km | 234.00 s | 0.31 |
| 14 | 130-140 km/h | 9.375 km | 250.00 s | 0.29 |
| 15 | 140-150 km/h | 10.625 km | 263.79 s | 0.27 |
| 16 | 150-160 km/h | 10.72 km | 248.98 s | 0.29 |
| 17 | 160-170 km/h | 10.76 | 234.76 s | 0.31 |
| 18 | 170-180 km/h | 10.8 km | 222.17 s | 0.32 |
| 19 | 180-190 km/h | 10.84 km | 210.94 s | 0.34 |
| 20 | 190-200 km/h | 10.88 km | 200.86 s | 0.36 |
| 21 | 200-210 km/h | 10.92 km | 191.77 s | 0.38 |
| 22 | 210-220 km/h | 10.96 km | 183.52 s | 0.39 |
| 23 | 220-230 km/h | 11.00 km | 176.00 s | 0.41 |
| 24 | 230-240 km/h | 11.04 km | 169.12 s | 0.43 |
| 25 | 240-250 km/h | 11.08 km | 162.81 s | 0.44 |

Threshold value T is freely definable but may be in a correlation with the driving time, for instance as the smallest common multiple of the values $t_0$ to $t_n$.

It is understood that the weight factor and the threshold value are able to be defined either using a predefined lookup table (LUT) or, in a deviating specific embodiment, they can also be defined using a direct calculation of the desired resolution, without departing from the scope of the present invention.

In order to define a lookup table that is independent of the accuracy of the polling frequency—the above table is configured for an accuracy of is—the sequence is able to be modified in the following manner: To begin with, a lookup table for a high scanning rate of 1000 Hz, for example, is calculated. In this case, the difference $\Delta t$ of the instantaneous time and the time of the last scanning would have to be utilized in each iteration. The counter is then incremented by the product of time difference $\Delta t$ and the weight factor allocated to the instantaneous velocity.

Figure 3:
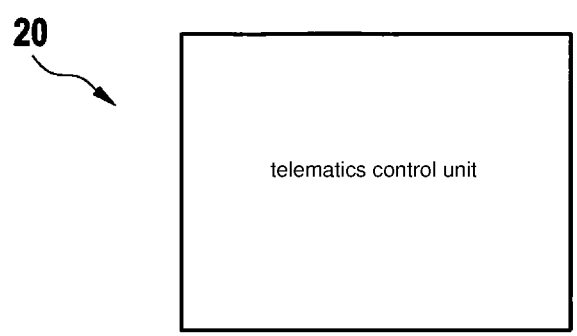
FIG. 3 shows schematically, a telematics control unit according to a second specific embodiment.

This method (10) may be implemented in software or hardware, for example, or in a mixed form of software and hardware, such as in a telematics control unit (20), as illustrated by the schematic representation of FIG. 3.

What is claimed is:

1. A method for scanning a location, comprising:
   measuring an ego velocity at predefined points in time;
   incrementing a counter as a function of the ego velocity;
   as soon as the counter reaches a predefined threshold value, determining the location;
   determining a weight factor as a function of the ego velocity, wherein the counter is incremented as a function of the weight factor;
   allocating a velocity interval from among a plurality of predefined velocity intervals to the ego velocity, which includes the ego velocity; and
   based on the allocated velocity interval, the weight factor is read out from a lookup table.

2. The method s recited in claim 1, wherein the respective location is transmitted via an air interface, and the lookup table is configured via the air interface.

3. The method as recited in claim 1, wherein the points in time are equidistant, and the counter is incremented by the weight factor.

4. The method as recited in claim 1, further comprising:
   forming a product from the weight factor and a time difference between the respective point in time in relation to a directly past point in time from among the points in time;
   wherein the counter is incremented by the product.

5. The method as recited in claim 1, wherein the location is determined with the aid of a global navigation satellite system.

6. A non-transitory machine-readable memory medium on which is stored a computer program for scanning a location, the computer program, when executed by a computer, causing the computer to perform:
- measuring an ego velocity at predefined points in time;
- incrementing a counter as a function of the ego velocity; and
- as soon as the counter reaches a predefined threshold value, determining the location,
- determining a weight factor as a function of the ego velocity, wherein the counter is incremented as a function of the weight factor;
- allocating a velocity interval from among a plurality of predefined velocity intervals to the ego velocity, which includes the ego velocity; and
- based on the allocated velocity interval, the weight factor is read out from a lookup table.

7. A telematics control unit for a motor vehicle, configured to scan a location, the telematics control unit configured to:
- measuring an ego velocity at predefined points in time;
- incrementing a counter as a function of the ego velocity; and
- as soon as the counter reaches a predefined threshold value, determining the location,
- determining a weight factor as a function of the ego velocity, wherein the counter is incremented as a function of the weight factor;
- allocating a velocity interval from among a plurality of predefined velocity intervals to the ego velocity, which includes the ego velocity; and
- based on the allocated velocity interval, the weight factor is read out from a lookup table.

* * * * *